Patented Aug. 29, 1944

2,356,955

UNITED STATES PATENT OFFICE 2,356,955

COMPOSITIONS

Robert M. Thomas, Union, N. J., and William J. Sparks, Alexandria, Va., assignors, by mesne assignments, to Jasco, Incorporated, a corporation of Louisiana No Drawing. Application December 21, 1939, Serial No. 310,438

5 Claims. (Cl. 260—79)

This invention relates to means for the improvement of the physical characteristics of polymeric substances such as polyisobutylene, and relates particularly to means for stabilizing and improving polymeric materials by the incorporation of sulfur thereinto.

In handling high molecular weight polymers produced by the low temperature polymerization of isobutylene-containing mixtures, difficulty has been encountered in maintaining the physical characteristics of the material during mechanical working, and in maintaining the desired high molecular weight. The polymer materials do not work readily on the mill but show a tendency to break up on the mill, to stick to the rolls, and to roll out irregularly in the form of rough, nodulate, weak and poor sheets. Likewise, there is a pronounced tendency on the part of the polymer to deteriorate by a breakdown of the molecular weight during treatment on mill, as well as during storage or upon standing, particularly at elevated temperatures.

The present invention provides means for overcoming these undesirable tendencies and these defects. The essence of the invention consists in the addition to the polymer, such as polyisobutylene, of elemental sulfur not exceeding approximately 3% or 4%. It is found that sulfur not in excess of this indicated amount shows a very pronounced smoothing and homogenizing effect upon the polymer during working on the mill, and in addition markedly stabilizes the polymer against breakdown from heat or storage.

The reason for this effect is not as yet clearly known. It does not appear that the sulfur combines with the polymer chemically and the polymer appears to be exceedingly resistant to combination with sulfur. It may be that the sulfur is soluble in the polymer since amounts less than about 3% produce no perceptible change in the appearance of the polymer, and show no tendency to "bloom." Somewhat larger amounts than about 3% assert similar protective and improving effects, and show a tendency to "bloom" upon the surface of the polymer. In addition, the presence of the sulfur very greatly reduces, or removes entirely, the tendency towards tackiness and stickiness which is otherwise present in the material, especially in material of medium to relatively moderate molecular weight.

It is to be noted that polyisobutylene does not vulcanize with sulfur as does rubber, and no phenomenon of vulcanization is believed to be involved in the invention, but only improvement in the physical properties of the polymer.

Thus, the invention improves the physical characteristics of polymer substances such as polyisobutylene and an object of the invention is to homogenize the material, improve its working characteristics upon the mill, improve is stability to heat and storage, and modify or remove the tackiness otherwise present in the material. Other objects and details of the invention will be apparent from the following description:

Among the valuable commercial materials produced from by-products of the oil cracking industry are the polyisobutylene-containing materials such as Vistanex Polybutene. These materials are produced by the polymerization at low temperatures of olefinic substances such as isobutylene, with or without other olefinic substances, when diluted with a diluent-refrigerant by the application to the mixture of liquefied gases of a Friedel-Crafts type catalyst such as boron trifluoride or dissolved aluminum chloride. The resulting polymer may have a molecular weight ranging from slightly above a thousand, to 250,000 or more, and the polymers having molecular weights above about 27,000 are rubbery materials of very valuable physical characteristics. The materials may be worked upon the ordinary roll mill, but are not, as ordinarily received from the polymerization procedure, wholly satisfactory substances for the milling operation, since they tend to adhere to the rolls, and may tend to form erratic, irregularly thick portions of sheets. This is readily overcome by the admixing into the material of approximately 1% to 3% of sulfur.

Such amounts of sulfur or even much smaller amounts to quantities as low as 0.01% of the weight of the polymer are effective in improving the stability of the polymer material to storage, as well as to heat, whether the heat is developed from working the material on the mill, during extrusion or from friction in use, or whether produced by elevated ambient temperature.

In preparing the stabilized polymer, the polymer and elemental sulfur may be mixed in any convenient way, either by kneading the two together, or by working the two upon roll mills or in the Banbury mixer or other mixing machine; or the material may be prepared with the aid of solvents which soften the polymer and permit the sulfur to be stirred in or dissolved in the softened polyisobutylene, or sufficient solvent may be used to produce a complete solution of the polymer into which the sulfur may be stirred, either dissolved or suspended, and the solvent thereafter removed.

Example 1

A sample of polymer of isobutylene, having a molecular weight of approximately 35,000, was admixed in a kneading machine with 2% of sulfur by kneading the materials together for a period of approximately three hours. At the conclusion of the admixing operation, the material was removed from the kneader, and after approximately fifteen minutes of working on the mill was sheeted out upon the roll mill. When so sheathed out, the material was non-tacky, of substantial uniformity of thickness and entirely clear. This material is highly advantageous for storage and shipping, and is even more advantageous for the commercial usages for which it is applied, including its use as a material for cable insulation, and for compounding with rubber or other substances.

Example 2

A sample of polyisobutylene of approximately 50,000 molecular weight was admixed with 3% of sulfur by working the two together upon the mill over a period of approximately 30 minutes. At the conclusion of this time interval the material was found to be in a smooth, evenly sheeted form, substantially clear and non-tacky and in particularly advantageous form for commercial use.

Example 3

Another sample of polyisobutylene of medium high molecular weight (60,000–80,000) was admixed on the mill with approximately 4% of sulfur. This material after about 30 minutes of working on the mill was found to be of smooth, uniform texture and thickness, and non-tacky, but was not fully clear, the larger quantity of sulfur apparently having introduced a small amount of opacity and light dispersion to the material. It appears that up to 3% of the sulfur is dissolved in the polymer, and that any excess over approximately 3% remains in the original state and is not dissolved in the polymer. This material is particularly advantageous for compounding with rubber where substantial amounts of sulfur are required, and in fact any desired amount of sulfur may be added to the polymer, such that when compounded with rubber the sulfur requirements of the rubber for satisfactory vulcanization are supplied by the sulfur incorporated into the polymer material.

Example 4

A sample of polyisobutylene having a molecular weight of approximately 90,000 was compounded with 1% of sulfur. The usual material at this relatively high molecular weight is normally substantially non-tacky, but does not readily sheet out into smooth, uniform, homogeneous sheets when worked upon the roll mill. However, after approximately 30 minutes of milling with the 1% of sulfur, the material was found to be not only non-tacky, but to be substantially uniform and homogeneous both in thickness and physical characteristics, and was a satisfactory and suitable material for the various uses to which the polyisobutylene may be applied.

Example 5

A sample of polyisobutylene of 84,000 molecular weight was kneaded in a Werner and Pfleiderer type of kneading machine for a period of three hours at a temperature of 140–150° C. It was found that after this kneading operation the molecular weight had been reduced to approximately 15,000.

Another sample of polyisobutylene having a molecular weight of 84,000 was kneaded with 0.53% of sulfur and the kneading continued for sixteen hours at a temperature ranging between 140–150° C. After the sixteen hours of kneading, the molecular weight was still 77,000.

Example 6

Another sample of polyisobutylene having a molecular weight of 70,000 was kneaded with 0.1% of sulfur for a period of sixteen hours at a temperature ranging between 140–150°C. At the conclusion of the sixteen hours of kneading, the molecular weight was still approximately 70,000, there being no perceptible reduction in the molecular weight.

It may be observed that amounts of sulfur less than approximately 1%, when added as above described, have substantially no effect upon the physical characteristics of the polymeric material, and no effect upon its chemical characteristics other than to increase its stability to heat, or to mechanical working, or both.

The above examples deal essentially with pure polyisobutylene. It has been found, however, that by a new and improved low temperature technique, it is possible to produce mixed polymers or interpolymers of olefinic substances which have new and useful and very interesting properties. Broadly, the new polymer is an interpolymer of an isoolefin and a diolefin, preferably but not necessarily a conjugated diolefin. The process involves the preparation of the mixture of the olefin, such as isobutylene, with the diolefin, such as butadiene, dimethyl butadiene, isoprene, pentadiene, etc., in admixture with a diluent-refrigerant such as liquid ethylene or liquid propane and solid carbon dioxide at temperatures ranging from −50° C. to −78° C. obtainable by solid carbon dioxide, to −98° C. obtainable by liquid ethylene, or lower, to temperatures obtainable by still other lower boiling diluent-refrigerants. The polymerization is conducted by the application to the cold mixture of a dissolved catalyst, preferably aluminum chloride dissolved in an alkyl halide such as ethyl or methyl chloride. The mixture of olefins preferably contains from 70 to 99.5 parts of isobutylene together with 30 to 0.5 parts of the diolefin, the proportions varying with the particular diolefin chosen. The polymerization proceeds rapidly to produce an interpolymer which in appearance and general physical characteristics is substantially indistinguishable from polyisobutylene, even though each molecule contains a small percentage of diolefinic molecules interpolymerized with the monoolefinic molecules. Chemically, the material is distinguished from simple polyisobutylene by a capability of reacting with sulfur under appropriate conditions to yield a cured material having an elastic limit, a definite and high tensile strength, a high elongation, and a high resistance to flexure and abrasion. The sulfurization reaction can be conducted at temperatures above about 150° C. but the amount of sulfur combinable at this temperature is small, the time required is very great, and the depolymerization or breakdown is excessive, yielding a poor cure and a poor product after cure. However, by the presence of a sulfurization aid of the type of Tuads (tetramethyl thiuram disulfide) the sulfurization reaction is readily conducted at temperatures ranging from 135° C. to 175° C. in a very few minutes, with substantially no depolymerization or molecular weight breakdown.

It is found, however, that the polymer as received from the polymerization process requires certain processing to obtain a homogeneous, coherent cure. It is believed that the polymerization procedure produces stable, perhaps highly unsaturated substances which at the polymerization temperature break down into gaseous or volatile substances which produce bubbles, flaws and defects in the cured product. It has been found possible to overcome this difficulty by a relatively drastic milling treatment in a Banbury type of mill at a relatively high temperature for a substantial period of time. However, this Banbury treatment is seriously injurious to the molecular weight of the material, and tends to produce an undesirable reduction in molecular weight.

It is now found that the interpolymer of isobutylene with a diolefin not only can be cured with sulfur as above pointed out, but also that at temperatures below the curing temperature and in the absence of the sulfurization aid, the presence of similar amounts of sulfur produces a similar protective effect upon the molecular weight of the polymer, avoiding the undesirable breakdown. For this purpose, approximately 0.1% to 1.5% or more of sulfur may be added to the raw polymer before the Banbury treatment. The addition of this small amount of sulfur asserts a very valuable protective effect upon the molecular weight of the interpolymer.

This is shown by the following example and series of experiments.

Example 7

In conducting this series of experiments, a sample of high grade interpolymer of isobutylene and butadiene containing approximately 1% of butadiene molecules interpolymerized with approximately 99% of isobutylene molecules, was treated in the Banbury mill for varying intervals of time at the temperature of 10 pounds pressure saturated steam (approximately 110° C.). A small size Banbury mixer was used having a convenient capacity of 250 grams. Successive batches of 250 grams each were worked in the Banbury mixer for successively longer intervals of time as indicated in Table A, then transferred quickly to a cold roll mill, sheeted out quickly, divided into four portions, and the required amount of sulfur and sulfurization aid worked in quickly on the cool roll mill, and the quartered batches separately cured for tensile strength and, elongation tests. The material before Banburying was compounded according to the following formula:

| | Parts |
|---|---|
| Isobutylene butadiene copolymer | 250 |
| Zinc oxide | 5 |
| Stearic acid | 3 |

After the Banbury treatment, the sulfur and sulfurization aid were incorporated as shown in the following supplementary formula:

Sulfur_____1, 1½, 2, 3 parts (as indicated)
Tuads (tetramethyl thiuram disulfide)___1 part The successive batches as so treated showed the tensile strength and elongation in the following table:

TABLE A

*Mechanical working without sulfur*

| Minutes worked | Amount of sulfur added on mill | | | | | | | |
|---|---|---|---|---|---|---|---|---|
| | 1% | | 1½% | | 2% | | 3% | |
| | Tens. | Elong. | Tens. | Elong. | Tens. | Elong. | Tens. | Elong. |
| 0 | | | | | | | 3,030 | 1,070 |
| 5 | 2,220 | 1,200 | 2,390 | 1,170 | 2,500 | 1,130 | 2,030 | 1,120 |
| 10 | 1,370 | 1,230 | 1,085 | 1,200 | 1,785 | 1,180 | 2,000 | 1,140 |
| 15 | 1,920 | 1,160 | 1,555 | 1,150 | 1,190 | 1,175 | 2,140 | 1,150 |
| 20 | 970 | 1,260 | 1,130 | 1,180 | 1,420 | 1,200 | 1,720 | 1,180 |
| 30 | Molecular wt. degraded. | | Blistered on cure. | | | | | |
| 40 | Do. | | | | | | | |
| 60 | Do. | | | | | | | |
| 120 | Do. | | | | | | | |

A similar series of batches were mixed and tested with the sulfur incorporated into the batch mix in the Banbury mixer before the milling treatment, instead of on the cool roll after the Banbury treatment, and tensile strengths and elongations were obtained.

TABLE B

*Mechanical working with sulfur*

| Minutes worked | 1% | | 2% | | 3% | |
|---|---|---|---|---|---|---|
| | Tens. | Elong. | Tens. | Elong. | Tens. | Elong. |
| 5 | 2,100 | 1,000 | 2,750 | 1,180 | 3,000 | 1,050 |
| 10 | 2,100 | 1,050 | 2,700 | 1,060 | 2,700 | 1,000 |
| 15 | 2,250 | 1,100 | 2,500 | 1,070 | 2,900 | 1,050 |
| 20 | 2,000 | 1,060 | 2,980 | 1,070 | 2,700 | 1,050 |
| 30 | 2,000 | 1,100 | 2,440 | 1,100 | 2,700 | 1,000 |
| 40 | 1,900 | 1,100 | 2,520 | 1,060 | 2,750 | 1,050 |
| 60 | 1,850 | 1,150 | 2,380 | 1,100 | 3,000 | 1,000 |
| 120 | 1,150 | 1,100 | 1,570 | 1,140 | 1,570 | 1,130 |

All of these samples were cured in a closed mold for 30 minutes at a temperature of 155° C.

It will be observed that when the raw polymer is worked in the Banbury mixer for more than fifteen minutes in the absence of sulfur, then cured with sulfur, the tensile strength falls off very materially, to the extent that the material may be so badly blistered on cure as to have no tensile strength. In comparison, when the material is worked on the mill in the presence of sulfur, little or no deterioration occurs even after two hours of working in the mill at this temperature.

It thus appears that the same gain in resistance to polymerization breakdown which occurs with plain polyisobutylene is present also with the interpolymer of polyisobutylene and a diolefin.

Likewise, the presence of the sulfur substantially improves the physical characteristics of the interpolymer or mixed polymer both in the Banbury mill on the rolls, and greatly facilitates both of these processing treatments.

Thus, the composition and process of the invention provide a substantially improved polyisobutylene, or polymerized isobutylene-containing substance having a higher uniformity and higher homogeneity than the pure material, as well as having a higher molecular weight and freedom from tackiness. In addition, the process of the invention maintains the high molecular weight through drastic heat and milling treatments, and over prolonged periods of storage, especially storage at relatively elevated temperatures.

While there are above disclosed but a limited number of embodiments of the invention, it is possible to produce still other embodiments without departing from the inventive concepts herein disclosed, and it is therefore desired that only such limitations be imposed upon the inventive claims as are stated therein or required by the prior art.

The invention claimed is:

1. In combination, a clear, colorless polyisobutylene having a molecular weight within the range of 27,000 to 250,000 and containing dissolved therein a stabilizing amount of sulfur within the range of 0.01% to 3%.

2. A clear, colorless stabilized olefinic polymer material having a molecular weight within the range of 27,000 to 250,000 and having dissolved therein a stabilizing amount of elemental sulfur within the range of 0.01% to 3%, the stabilized polymer being characterized by a high molecular weight, and the property of retaining a major portion of the high molecular weight during storage, heating and mechanical working.

3. A clear, colorless stabilized olefinic low temperature polymer of a major proportion isobutylene and a minor proportion of a diolefin prepared by the addition thereto of a solution of a Friedel-Crafts catalyst in a low-freezing, non-complex forming solvent at temperatures within the range between —50° C. and —98° C. containing dissolved therein a stabilizing amount of elemental sulfur within the range of 0.01% to 4%.

4. The process of improving the physical characteristics and stability of an isoolefinic polymer, comprising the step of dissolving in the polymer in the substantial absence of other substances a substantial proportion of elemental sulfur, and thereafter sheeting out the stabilized olefinic polymer on a roll mill to yield a non-tacky material having nearly the same molecular weight which characterized the material before processing on the roll mill.

5. The method of improving the physical characteristics and stability of a low temperature olefinic polymer of a major proportion of isobutylene and a minor proportion of a diolefin prepared at a temperature within the range between —50° C. and —98° C. by the application to the olefinic mixture of a Friedel Crafts catalyst dissolved in a low-freezing, non-complex forming solvent, comprising the step of dissolving in the polymer a substantial proportion of elemental sulfur and sulfur non-reactive fillers, and thereafter sheeting out the material on the roll mill to yield a non-tacky material having nearly the same molecular weight which characterized the material before processing on the roll mill.

ROBERT M. THOMAS.
WILLIAM J. SPARKS.